US008605031B2

(12) United States Patent
Wu

(10) Patent No.: US 8,605,031 B2
(45) Date of Patent: Dec. 10, 2013

(54) DRIVING APPARATUS OF BACKLIGHT MODULE AND DRIVING METHOD THEREOF

(75) Inventor: Tung-Ying Wu, Miao-Li County (TW)

(73) Assignee: Chimei Innolux Corporation, Miao-Li County (TW)

( * ) Notice: Subject to any disclaimer, the term of this patent is extended or adjusted under 35 U.S.C. 154(b) by 290 days.

(21) Appl. No.: 13/093,533

(22) Filed: Apr. 25, 2011

(65) Prior Publication Data

US 2012/0092386 A1 Apr. 19, 2012

(30) Foreign Application Priority Data

Oct. 15, 2010 (TW) .............................. 99135269 A

(51) Int. Cl.
*G09G 3/36* (2006.01)
*G06K 9/00* (2006.01)

(52) U.S. Cl.
USPC ............................ 345/102; 382/167; 382/169

(58) Field of Classification Search
USPC ......... 345/55, 77, 84, 89, 102, 156, 204, 214, 345/545, 690, 697; 382/168, 167, 169; 349/37, 61, 85
See application file for complete search history.

(56) References Cited

U.S. PATENT DOCUMENTS

2006/0146005 A1* 7/2006 Baba et al. .................... 345/102
2007/0092139 A1* 4/2007 Daly ............................. 382/169
2009/0052774 A1* 2/2009 Yoshii et al. .................. 382/167

* cited by examiner

*Primary Examiner* — Quan-Zhen Wang
*Assistant Examiner* — Michael J Eurice
(74) *Attorney, Agent, or Firm* — McClure, Qualey & Rodack, LLP

(57) ABSTRACT

A driving apparatus of a backlight module and a driving method thereof are provided. The driving method includes following steps. An image signal is received. A first grayscale mean of a current frame and a second grayscale mean of a previous frame are calculated according to the image signal. A first difference between the first grayscale mean and the second grayscale mean is calculated. A first duty corresponding to the current frame and a second duty corresponding to the previous frame are calculated according to the image signal. When the first difference is smaller than or equal to a backlight flicker threshold, a backlight control signal is generated according to the second duty and a first regulation value. When the first difference is greater than the backlight flicker threshold, the backlight control signal is generated according to the second duty and a second regulation value.

14 Claims, 4 Drawing Sheets

DRIVING APPARATUS OF BACKLIGHT MODULE AND DRIVING METHOD THEREOF

CROSS-REFERENCE TO RELATED APPLICATION

This application claims the priority benefit of Taiwan application serial no. 99135269, filed on Oct. 15, 2010. The entirety of the above-mentioned patent application is hereby incorporated by reference herein and made a part of this specification.

BACKGROUND OF THE INVENTION

1. Field of the Invention

The invention generally relates to a driving apparatus and a driving method, and more particularly, to a driving apparatus of a backlight module and a driving method thereof.

2. Description of Related Art

The multimedia technology has been quickly evolving due to the development of semiconductor devices or display devices. As to displays, liquid crystal display (LCD) has gradually become the mainstream in the display market thanks to its many advantages such as high image quality, high space efficiency, low power consumption, and no radiation. Because a LCD panel itself does not emit light, a backlight module has to be disposed below the LCD panel to provide a surface light source, so as to allow the LCD panel to display images.

Generally speaking, backlight modules may be categorized into side-type backlight modules and direct-type backlight modules. Besides, they may also be categorized into cold cathode fluorescent lamp (CCFL) backlight modules and light emitting diode (LED) backlight modules based on the types of light sources thereof In a direct-type backlight module, because the light directly enters the user's eyes, a longer light mixing distance is required for evenly mixing the light, which causes the thickness of the backlight module to be increased. Instead, in a side-type backlight module, the light is evenly mixed by a light guide plate before it enters the user's eyes, so that the side-type backlight module is relatively thinner.

In recent years, the size of LCD has been increased constantly. A direct-type backlight module can divide an entire LCD panel into a plurality of light-emitting regions, and the luminance corresponding to each light-emitting region is regulated according to the image content within the light-emitting region (i.e., a local dimming technique), so as to enhance the contrast ratio of the frame. However, when a dynamic frame is displayed, the foreground object moves quickly. In this case, flicker may be produced on the moving object (i.e., the moving object may blink) if the luminance of the light-emitting regions is regulated through a local dimming technique.

FIG. 1 is a diagram illustrating how a liquid crystal display (LCD) displays a dynamic frame by using a conventional local dimming technique. Referring to FIG. 1, herein it is assumed that the foreground object 110 has a higher grayscale value and the background has a lower grayscale value (i.e., the object 110 is brighter than the background). In a frame Fn, the object 110 almost takes up the entire display areas D1 and D2, and the corresponding light-emitting regions B1 and B2 provide higher luminance so that the object 110 is displayed as a brighter object.

In a frame Fn+1, the object 110 moves rightwards (i.e., the object 110'). Herein the object 110' takes up the entire display area D2 but only about half of the display areas D1 and D3. Thus, the corresponding light-emitting region B2 provides a higher luminance while the light-emitting regions B1 and B3 provide a luminance about half of that provided by the light-emitting region B2. Because the light source is diffusible and the light-emitting regions B1 and B3 provide a lower luminance, the luminance of the light-emitting region B2 is distributed to the display areas D1 and D3 and accordingly the brightness of the object 110' is reduced.

In a frame Fn+2, the object 110' moves further rightwards (i.e., the object 110"). Herein the object 110" takes up the entire display areas D2 and D3. Thus, the corresponding light-emitting regions B2 and B3 provide a higher luminance so that the object 110" is again displayed as a brighter object. Accordingly, a bright, dark, and bright display effect is observed from the object 110 to the object 110". Thereby, a flickering sensation is caused by the conventional local dimming technique when a foreground object moves quickly.

SUMMARY OF THE INVENTION

Accordingly, the invention is directed to a driving apparatus of a backlight module and a driving method thereof, wherein frame flicker is reduced when a liquid crystal display (LCD) displays dynamic frames.

The invention provides a driving apparatus of a backlight module. The driving apparatus includes a grayscale mean calculating unit, an error calculating unit, a backlight duty calculating unit, and a backlight control signal generating unit. The grayscale mean calculating unit receives an image signal and calculates a first grayscale mean of a current frame and a second grayscale mean of a previous frame. The error calculating unit is coupled to the grayscale mean calculating unit. The error calculating unit receives the first grayscale mean and the second grayscale mean and calculates a first difference between the first grayscale mean and the second grayscale mean. The backlight duty calculating unit receives the image signal and calculates a first duty corresponding to the current frame and a second duty corresponding to the previous frame. The backlight control signal generating unit is coupled to the error calculating unit and the backlight duty calculating unit to receive the first duty, the second duty, and the first difference. When the first difference is smaller than or equal to a backlight flicker threshold, the backlight control signal generating unit generates a backlight control signal according to the second duty and a first regulation value. When the first difference is greater than the backlight flicker threshold, the backlight control signal generating unit generates the backlight control signal according to the second duty and a second regulation value. Herein the first regulation value is different from the second regulation value.

According to an embodiment of the invention, when the first difference is smaller than or equal to the backlight flicker threshold and the first duty is greater than or equal to the second duty, the duty of the backlight control signal is equal to the second duty plus the first regulation value.

According to an embodiment of the invention, when the first difference is smaller than or equal to the backlight flicker threshold and the first duty is smaller than the second duty, the duty of the backlight control signal is equal to the second duty minus the first regulation value.

According to an embodiment of the invention, when the first difference is greater than the backlight flicker threshold and the first duty is greater than or equal to the second duty, the duty of the backlight control signal is equal to the second duty plus the second regulation value.

According to an embodiment of the invention, when the first difference is greater than the backlight flicker threshold and the first duty is smaller than the second duty, the duty of the backlight control signal is equal to the second duty minus the second regulation value.

The invention also provides a driving method of a backlight module. The driving method includes following steps. An image signal is received. A first grayscale mean of a current frame and a second grayscale mean of a previous frame are calculated according to the image signal. A first difference between the first grayscale mean and the second grayscale mean is calculated. A first duty corresponding to the current frame and a second duty corresponding to the previous frame are calculated according to the image signal. When the first difference is smaller than or equal to a backlight flicker threshold, a backlight control signal is generated according to the second duty and a first regulation value. When the first difference is greater than the backlight flicker threshold, the backlight control signal is generated according to the second duty and a second regulation value.

According to an embodiment of the invention, the first regulation value is a product of the first reference value and a ratio of a duty distribution value to a duty error value, wherein the first reference value is smaller than 1 and greater than 0, the duty distribution value is the difference between a maximum duty and a minimum duty, and the duty error value is the difference between the first duty and the second duty.

According to an embodiment of the invention, the second regulation value is a product of the second reference value and a ratio of the duty distribution value to the duty error value, wherein the second reference value is greater than or equal to 1.

According to an embodiment of the invention, the first reference value and the second reference value are reciprocal to each other.

According to an embodiment of the invention, in the step of generating the backlight control signal according to the second duty and the first regulation value, the duty of the backlight control signal is equal to the second duty plus the first regulation value when the first duty is greater than or equal to the second duty, and the duty of the backlight control signal is equal to the second duty minus the first regulation value when the first duty is smaller than the second duty.

According to an embodiment of the invention, in the step of generating the backlight control signal according to the second duty and the second regulation value, the duty of the backlight control signal is equal to the second duty plus the second regulation value when the first duty is greater than or equal to the second duty, and the duty of the backlight control signal is equal to the second duty minus the second regulation value when the first duty is smaller than the second duty.

As described above, the invention provides a driving apparatus of a backlight module and a driving method thereof, wherein the backlight control signal is generated according to the second duty and the first regulation value when the first difference is smaller than the backlight flicker threshold so that flicker caused by a moving foreground object in a conventional local dimming technique can be prevented by appropriately reducing the first regulation value. Thereby, the display quality of dynamic frames is improved.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
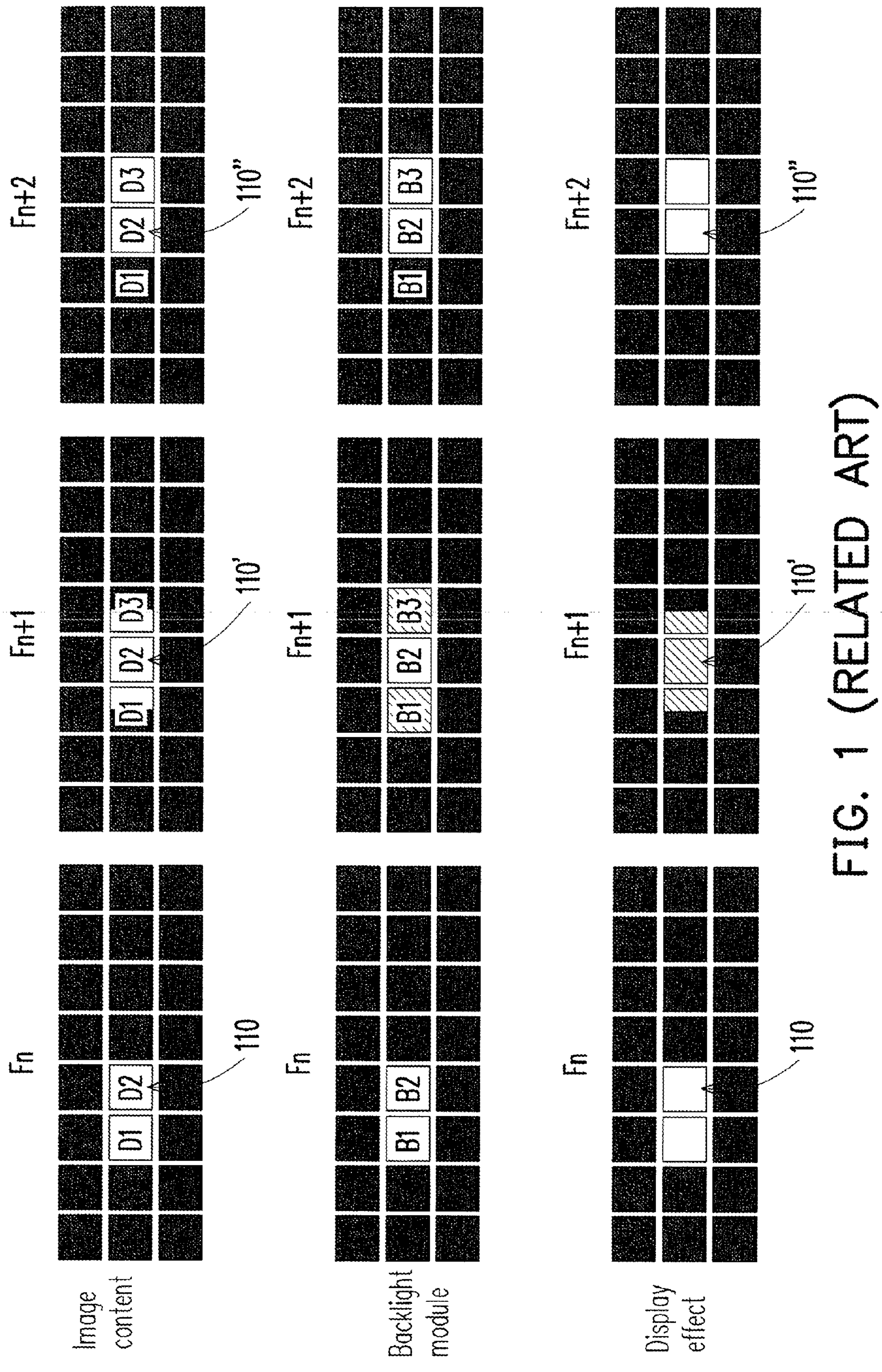
FIG. 1 (RELATED ART)
FIG. 1 is a diagram illustrating how a liquid crystal display (LCD) displays a dynamic frame by using a conventional local dimming technique.

Reference will now be made in detail to the present preferred embodiments of the invention, examples of which are illustrated in the accompanying drawings. Wherever possible, the same reference numbers are used in the drawings and the description to refer to the same or like parts.

Figure 2:
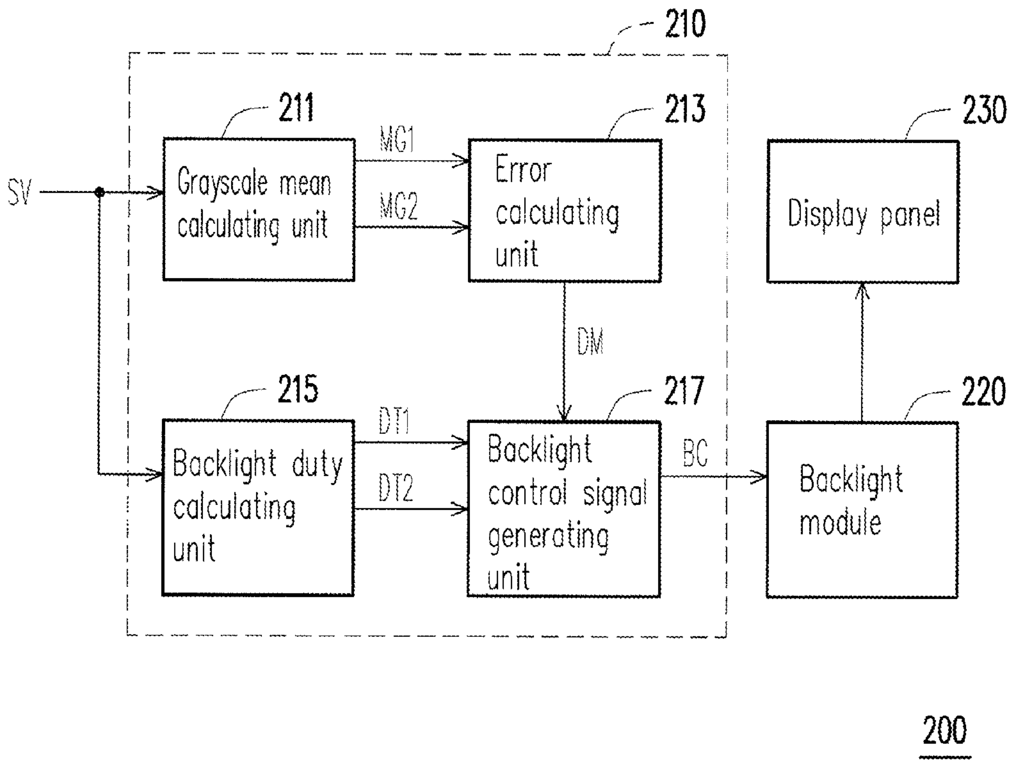
FIG. 2 is a system diagram of a display according to an embodiment of the invention.

FIG. 2 is a system diagram of a display according to an embodiment of the invention. Referring to FIG. 2, in the present embodiment, the display 200 includes at least a driving apparatus 210, a backlight module 220, and a display panel 230. The display panel 230 is a liquid crystal display (LCD) panel, and the backlight module 220 has a plurality of light-emitting regions. The driving apparatus 210 receives an image signal SV and generates a backlight control signal BC according to the image signal SV.

The backlight module 220 regulates the luminance of each light-emitting region according to the backlight control signal BC, so as to provide a (surface) light source to the display panel 230. The display panel 230 displays images according to the (surface) light source provided by the backlight module 220.

Herein the number of the backlight control signal BC may be corresponding to the number of the light-emitting regions. Namely, each backlight control signal BC is corresponding to one light-emitting region, wherein the luminance of the light-emitting region is corresponding to the duty of the backlight control signal BC. Namely, if the luminance of a light-emitting region is 80, the duty of the corresponding backlight control signal BC is then 80%.

To be specific, the driving apparatus 210 includes a grayscale mean calculating unit 211, an error calculating unit 213, a backlight duty calculating unit 215, and a backlight control signal generating unit 217. The grayscale mean calculating unit 211 receives the image signal SV and calculates a first grayscale mean MG1 of a current frame and a second grayscale mean MG2 of a previous frame. The error calculating unit 213 is coupled to the grayscale mean calculating unit 211 to receive the first grayscale mean MG1 and the second grayscale mean MG2 and calculate a first difference DM between the first grayscale mean MG1 and the second grayscale mean MG2.

The backlight duty calculating unit 215 receives the image signal SV and calculates a first duty DT1 corresponding to the current frame and a second duty DT2 corresponding to the previous frame. The backlight control signal generating unit 217 is coupled to the error calculating unit 213 and the backlight duty calculating unit 215 to receive the first duty DT1, the second duty DT2, and the first difference DM.

When the first difference DM is smaller than or equal to a backlight flicker threshold, the backlight control signal generating unit 217 generates the backlight control signal BC according to the second duty DT2 and a first regulation value (i.e., determines the duty of the backlight control signal BC according to the second duty DT2 and the first regulation value). When the first difference DM is greater than the backlight flicker threshold, the backlight control signal generating unit 217 generates the backlight control signal BC according to the second duty DT2 and a second regulation value (i.e., determines the duty of the backlight control signal BC according to the second duty DT2 and the second regulation value). Herein the first regulation value and the second regulation value are generated according to the first duty DT1 and the second duty DT2, as described later on.

The numbers of the first duty DT1 and the second duty DT2 may also be corresponding to the number of the light-emitting regions. Namely, each first duty DT1 and each second duty DT2 are corresponding to one light-emitting region, and the luminance of each light-emitting region is regulated according to the corresponding second duty DT2 and the corresponding first regulation value or second regulation value. In the same frame, only one of the first regulation value and the second regulation value is used, and the numbers of the first regulation value and the second regulation value may be 1 or corresponding to the number of the light-emitting regions. Namely, the luminance of each light-emitting region may be regulated by using the same or the corresponding first regulation value or second regulation value, which is not limited in the invention and may be determined by those having ordinary knowledge in the art.

Figure 3A:
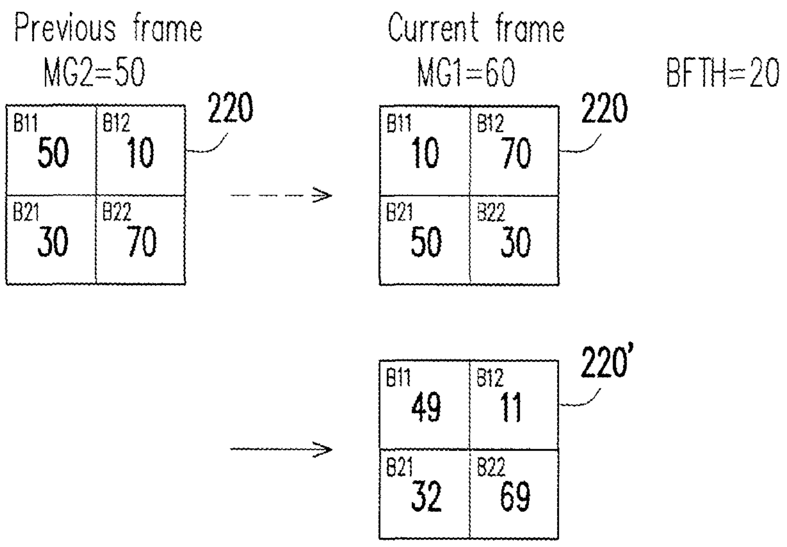
FIG. 3A and FIG. 3B are diagrams illustrating the luminance regulation performed within a plurality of light-emitting regions of a backlight module according to embodiments of the invention.
Figure 3B:
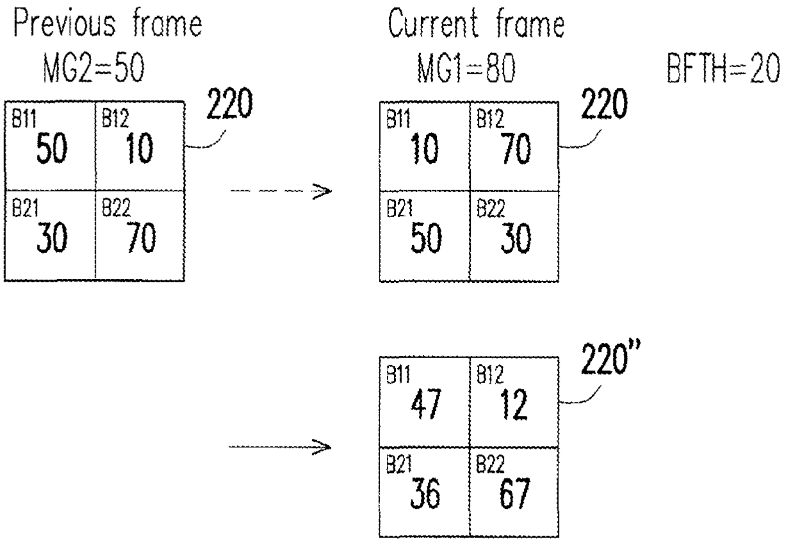

FIG. 3A and FIG. 3B are diagrams illustrating the illumination regulation performed within a plurality of light-emitting regions of a backlight module according to embodiments of the invention. Referring to FIG. 3A, in the present embodiment, it is assumed that the first grayscale mean MG1 of the current frame is 60, the second grayscale mean MG2 of the previous frame is 50, the backlight flicker threshold BFTH is 20, and the backlight module 220 has four light-emitting regions B11, B12, B21, and B22. In the previous frame, it is assumed that the luminance of the light-emitting region B11 is 50 (i.e., the duty of the corresponding backlight control signal BC is 50%), the luminance of the light-emitting region B12 is 10 (i.e., the duty of the corresponding backlight control signal BC is 10%), the luminance of the light-emitting region B21 is 30 (i.e., the duty of the corresponding backlight control signal BC is 30%), and the luminance of the light-emitting region B22 is 70 (i.e., the duty of the corresponding backlight control signal BC is 70%). Herein the luminance of the light-emitting regions B11, B12, B21, and B22 in the previous frame is the second duty DT2.

Through calculation, the target luminance of the light-emitting regions B11, B12, B21, and B22 in the current frame is respectively 10, 70, 50, and 30. Herein the luminance of the light-emitting regions B11, B12, B21, and B22 in the current frame is the first duty DT1. Since the first difference DM is 10 (i.e., 60-50), which is smaller than the backlight flicker threshold BFTH (i.e., 20), a foreground object instead of the entire scene is moving. In this case, the actual luminance of the light-emitting regions B11, B12, B21, and B22 in the current frame is regulated according to the corresponding second duty DT2 and the corresponding first regulation value. The first regulation value is the product of a first reference value and the ratio of a duty distribution value to a duty error value, wherein the first reference value is greater than 0 and smaller than 1, the duty distribution value is the difference between a maximum duty and a minimum duty, and the duty error value is the difference between the first duty and the second duty.

For example, as shown in FIG. 3A, the first reference value is assumed to be 0.5, and the duty distribution value is equal to the maximum duty (i.e., 70) minus the minimum duty (i.e., 10), namely, 60. Regarding the light-emitting region B11, the second duty DT2 thereof is 50, and the first duty DT1 thereof is 10. Herein the duty error value is the difference (i.e., 40) between the first duty (i.e., 10) and the second duty (i.e., 50), and the first regulation value corresponding to the light-emitting region B11 is 0.75 (i.e., 0.5×60/40), wherein the first digit after the decimal point in the first regulation value is carried and the first regulation value is rounded (i.e., the first regulation value corresponding to the light-emitting region B11 is equal to 1 after the first decimal digit thereof is carried). When the first duty DT1 is smaller than the second duty DT2, the luminance of the light-emitting region B11 should be reduced. Accordingly, the actual luminance of the light-emitting region B11 is regulated to 49 (i.e., 50−1).

Regarding the light-emitting region B12, the second duty DT2 thereof is 10, and the first duty DT1 thereof is 70. In this case, the duty error value is the difference (i.e., 60) between the first duty (i.e., 70) and the second duty (i.e., 10), and the first regulation value corresponding to the light-emitting region B12 is 0.5 (i.e., 0.5×60/60), wherein the first digit after the decimal point in the first regulation value is carried and the first regulation value is rounded (i.e., the first regulation value corresponding to the light-emitting region B12 is equal to 1 after the first decimal digit thereof is carried). When the first duty DT1 is greater than or equal to the second duty DT2, the luminance of the light-emitting region B12 should be increased. Accordingly, the actual luminance of the light-emitting region B12 is regulated to 11 (i.e., 10+1).

Regarding the light-emitting region B21, the second duty DT2 thereof is 30, and the first duty DT1 thereof is 50. Herein the duty error value is the difference (i.e., 20) between the first duty (i.e., 50) and the second duty (i.e., 30), and the first regulation value corresponding to the light-emitting region B21 is 1.5 (i.e., 0.5×60/20), wherein the first digit after the decimal point in the first regulation value is carried and the first regulation value is rounded (i.e., the first regulation value corresponding to the light-emitting region B21 is equal to 2 after the first decimal digit thereof is carried). When the first duty DT1 is greater than or equal to the second duty DT2, the luminance of the light-emitting region B21 should be increased. Accordingly the actual luminance of the light-emitting region B21 is regulated to 32 (i.e., 30+2).

Regarding the light-emitting region B22, the second duty DT2 thereof is 70, and the first duty DT1 thereof is 30. Herein the duty error value is the difference (i.e., 40) between the first duty (i.e., 30) and the second duty (i.e., 70), and the first regulation value corresponding to the light-emitting region B22 is 0.75 (i.e., 0.5×60/40), wherein the first digit after the decimal point in the first regulation value is carried and the first regulation value is rounded (i.e., the first regulation value corresponding to the light-emitting region B22 is equal to 1 after the first decimal digit thereof is carried). When the first duty DT1 is smaller than the second duty DT2, the luminance of the light-emitting region B22 should be reduced. Accordingly, the actual luminance of the light-emitting region B22 is regulated to 69 (i.e., 70−1).

The actual luminance of the backlight module in the current frame is as that of the backlight module 220'. Since the regulation range of the luminance of each light-emitting region is reduced, the problem of flicker in the conventional local dimming technique caused by a moving foreground object is resolved.

Referring to FIG. 3B, the difference between the present embodiment and the embodiment illustrated in FIG. 3A is that in the present embodiment, the first grayscale mean MG1 is 80. Since the first difference DM is 30 (i.e., 80−50), which is greater than the backlight flicker threshold BFTH (i.e., 20), the entire scene changes. In this case, the actual luminance of the light-emitting regions B11, B12, B21, and B22 in the current frame is regulated according to the corresponding second duty DT2 and the corresponding second regulation value. The second regulation value is the product of a second reference value and the ratio of the duty distribution value to the duty error value, wherein the second reference value is greater than or equal to 1.

For example, as shown in FIG. 3B, the second reference value is assumed to be 2 (i.e., the second reference value is set as the reciprocal of the first reference value, but the invention is not limited herein), and the duty distribution value is also equal to the maximum duty (i.e., 70) minus the minimum duty (i.e., 10), namely, 60. The duty error values respectively corresponding to the light-emitting regions B11, B12, B21, and B22 can be referred to foregoing descriptions and will not be described herein.

Regarding the light-emitting region B11, because the corresponding second regulation value is 3 (i.e., 2×60/40), the actual luminance of the light-emitting region B11 is regulated to 47 (i.e., 50−3).

Regarding the light-emitting region B12, because the corresponding second regulation value is 2 (i.e., 2×60/60), the actual luminance of the light-emitting region B12 is regulated to 12 (i.e., 10+2). Regarding the light-emitting region B21, because the corresponding second regulation value is 6 (i.e., 2×60/20), the actual luminance of the light-emitting region B21 is regulated to 36 (i.e., 30+6). Regarding the light-emitting region B22, because the corresponding second regulation value is 3 (i.e., 2×60/40), the actual luminance of the light-emitting region B22 is regulated to 67 (i.e., 70−3). The actual luminance of the backlight module in the current frame is as that of the backlight module 220".

Figure 4:
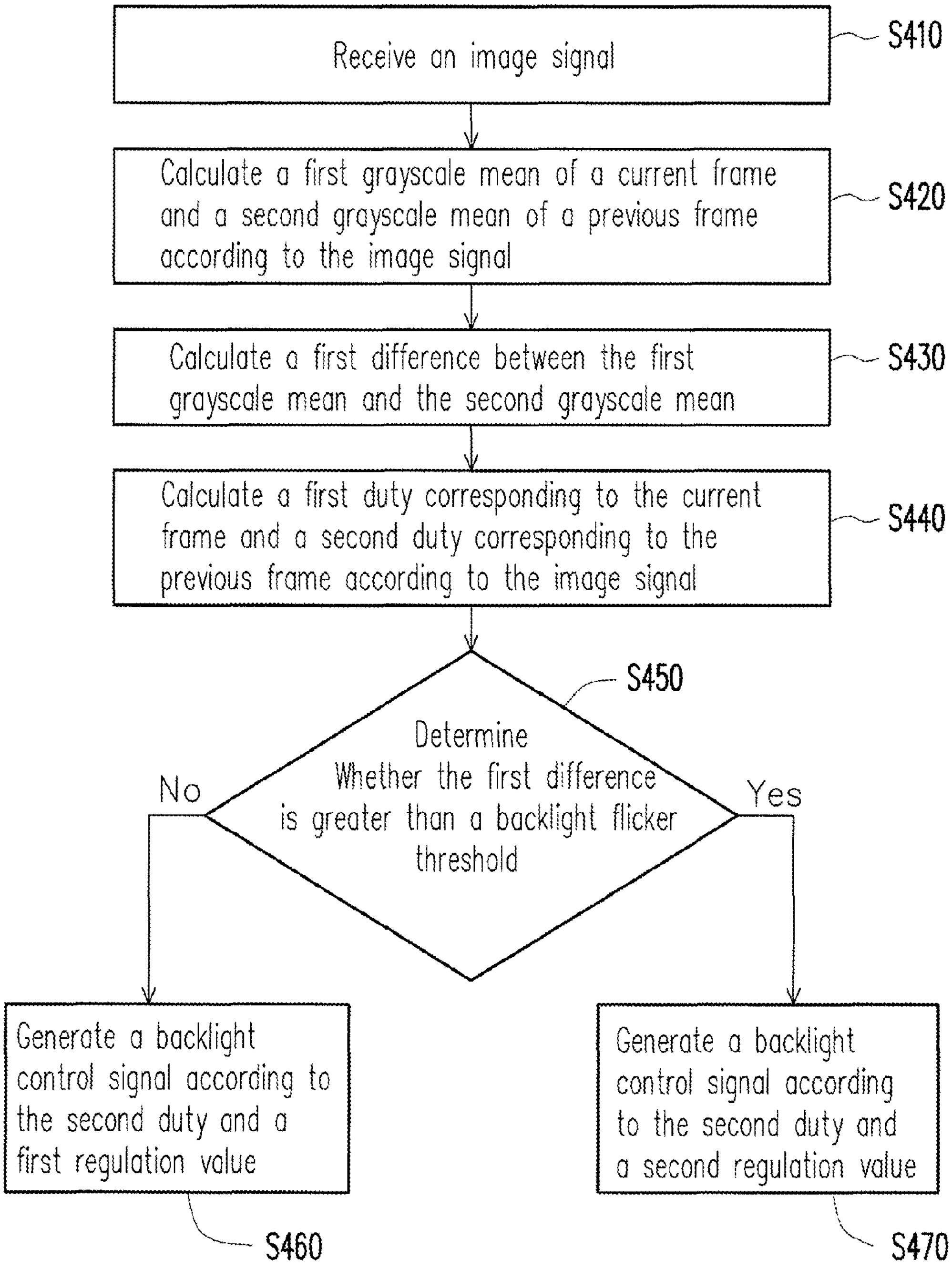
FIG. 4 is a flowchart of a driving method of a backlight module according to an embodiment of the invention.

A driving method of a backlight module is derived based on the embodiments described above. FIG. 4 is a flowchart of a driving method of a backlight module according to an embodiment of the invention. Referring to FIG. 4, in the present embodiment, an image signal is first received (step S410). Then, and a first grayscale mean of a current frame and a second grayscale mean of a previous frame are calculated according to the image signal (step S420). Next, a first difference between the first grayscale mean and the second grayscale mean is calculated (step S430). Besides, a first duty corresponding to the current frame and a second duty corresponding to the previous frame are calculated according to the image signal (step S440). After that, whether the first difference is greater than a backlight flicker threshold is determined (step S450). When the first difference is smaller than or equal to the backlight flicker threshold, a backlight control signal is generated according to the second duty and a first regulation value (step S460). Contrarily, When the first difference is greater than the backlight flicker threshold, the backlight control signal is generated according to the second duty and a second regulation value (step S470). Herein the first regulation value and the second regulation value are generated according to the first duty and the second duty, and the details of foregoing steps can be referred to the descriptions of foregoing embodiments therefore will not be described herein.

In summary, the invention provides a driving apparatus of a backlight module and a driving method thereof, wherein when the first difference is smaller than the backlight flicker threshold, the regulation range of each light-emitting region is reduced. Thereby, the problem of flicker in the conventional local dimming technique caused by a moving foregoing object can be resolved, and accordingly the display quality of dynamic frames can be improved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A driving apparatus of a backlight module, the backlight module has a plurality of light-emitting regions, comprising:

a grayscale mean calculating unit, for receiving an image signal and calculating a first grayscale mean of a current frame and a second grayscale mean of a previous frame;

an error calculating unit, coupled to the grayscale mean calculating unit, for receiving the first grayscale mean and the second grayscale mean and calculating a first difference between the first grayscale mean and the second grayscale mean;

a backlight duty calculating unit, for receiving the image signal and calculating a first duty of one of the light-emitting regions corresponding to the current frame and a second duty of the one of the light-emitting regions corresponding to the previous frame; and a backlight control signal generating unit, coupled to the error calculating unit and the backlight duty calculating unit, for receiving the first duty, the second duty, and the first difference, wherein when the first difference is smaller than or equal to a backlight flicker threshold, the backlight control signal generating unit generates a backlight control signal of the one of the light-emitting regions according to the second duty and a first regulation value, when the first difference is greater than the backlight flicker threshold, the backlight control signal generating unit generates the backlight control signal of the one of the light-emitting regions according to the second duty and a second regulation value, and the first regulation value is different from the second regulation value.

2. The driving apparatus according to claim 1, wherein when the first difference is smaller than or equal to the backlight flicker threshold and the first duty is greater than or equal to the second duty, a duty of the backlight control signal is equal to the second duty plus the first regulation value.

3. The driving apparatus according to claim 1, wherein when the first difference is smaller than or equal to the backlight flicker threshold and the first duty is smaller than the second duty, a duty of the backlight control signal is equal to the second duty minus the first regulation value.

4. The driving apparatus according to claim 1, wherein when the first difference is greater than the backlight flicker threshold and the first duty is greater than or equal to the second duty, a duty of the backlight control signal is equal to the second duty plus the second regulation value.

5. The driving apparatus according to claim 1, wherein when the first difference is greater than the backlight flicker threshold and the first duty is smaller than the second duty, a duty of the backlight control signal is equal to the second duty minus the second regulation value.

6. The driving apparatus according to claim 1, wherein the first regulation value is a product of a first reference value and a ratio of a duty distribution value to a duty error value, wherein the first reference value is smaller than 1 and greater than 0, the duty distribution value is a difference between a maximum duty and a minimum duty, and the duty error value is a difference between the first duty and the second duty.

7. The driving apparatus according to claim 6, wherein the second regulation value is a product of a second reference value and a ratio of the duty distribution value to the duty error value, wherein the second reference value is greater than or equal to 1.

8. The driving apparatus according to claim 7, wherein the first reference value and the second reference value are reciprocal to each other.

9. A driving method of a backlight module, the backlight module has a plurality of light-emitting regions, comprising:

receiving an image signal;

calculating a first grayscale mean of a current frame and a second grayscale mean of a previous frame according to the image signal;

calculating a first difference between the first grayscale mean and the second grayscale mean;

calculating a first duty of one of the light-emitting regions corresponding to the current frame and a second duty of the one of the light-emitting regions corresponding to the previous frame according to the image signal;

when the first difference is smaller than or equal to a backlight flicker threshold, generating a backlight control signal of the one of the light-emitting regions according to the second duty and a first regulation value; and when the first difference is greater than the backlight flicker threshold, generating the backlight control signal of the one of the light-emitting regions according to the second duty and a second regulation value, wherein the second regulation value is different from the first regulation value.

10. The driving method according to claim 9, wherein the step of generating the backlight control signal according to the second duty and the first regulation value comprises:

wherein when the first duty is greater than or equal to the second duty, a duty of the backlight control signal is equal to the second duty plus the first regulation value; and when the first duty is smaller than the second duty, the duty of the backlight control signal is equal to the second duty minus the first regulation value.

11. The driving method according to claim 9, wherein the step of generating the backlight control signal according to the second duty and the second regulation value comprises:

wherein when the first duty is greater than or equal to the second duty, a duty of the backlight control signal is equal to the second duty plus the second regulation value; and when the first duty is smaller than the second duty, the duty of the backlight control signal is equal to the second duty minus the second regulation value.

12. The driving method according to claim 9, wherein the first regulation value is a product of a first reference value and a ratio of a duty distribution value to a duty error value, wherein the first reference value is smaller than 1 and greater than 0, the duty distribution value is a difference between a maximum duty and a minimum duty, and the duty error value is a difference between the first duty and the second duty.

13. The driving method according to claim 12, wherein the second regulation value is a product of a second reference value and a ratio of the duty distribution value to the duty error value, wherein the second reference value is greater than or equal to 1.

14. The driving method according to claim 13, wherein the first reference value and the second reference value are reciprocal to each other.

* * * * *